M. J. DEWALD.
Coffee-Pot.
No. 168,327. Patented Oct. 5, 1875.
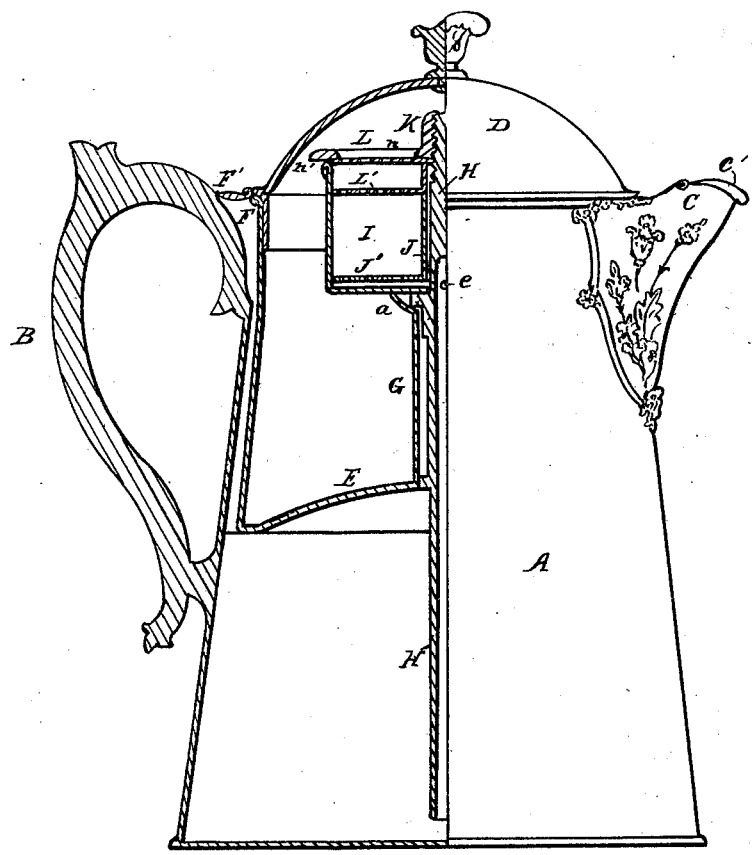
WITNESSES.
J. H. Lawlor
F. F. Warner.
INVENTOR.
Matthew J. Dewald.

UNITED STATES PATENT OFFICE.

MATTHEW J. DEWALD, OF CHICAGO, ILLINOIS.

IMPROVEMENT IN COFFEE-POTS.

Specification forming part of Letters Patent No. 168,327, dated October 5, 1875; application filed August 9, 1875.

*To all whom it may concern:*

Be it known that I, MATTHEW J. DEWALD, of Chicago, in the county of Cook and State of Illinois, have invented certain new and useful Improvements in Coffee-Pots, of which improvements the following is a full, clear, and exact description, which will enable others skilled in the art to which my invention appertains to make and use the said improvements, reference being had to the accompanying drawing, forming a part hereof, and in which the figure there shown represents a side elevation, shown partly in section, of a coffee-pot embodying my invention.

In the drawing, A represents the outer part or body of the pot; B, the handle; C, the pouring-lip, and D the cover or lid of the body. E is a diaphragm extending horizontally across the central part of the interior of the pot. F is a filling tube or channel, entering the chamber below the diaphragm E, and terminating, at the other end, at a point above the said diaphragm. F' is a cap or lid covering the upper end of the tube F. G is a tubular projection extending upwardly and vertically through the diaphragm E. The upper end of this tube is provided with a dish-shaped flange, a. H is a tube closed and screw-threaded at the upper end, and having the ports e e in the upper portion of its tubular part, as shown. I is a cup attached to the upper part of the tube H. This tube is arranged within the tube G, and the cup rests on the flange a, and supports the lower end of the tube H a little way above the bottom of the pot. J is a sleeve arranged about the tube H, and J' is a perforated disk or flange attached to this sleeve, and extending across the bottom of the cup I. The ports e e lie between the bottom of the cup I and the flange J'. K is a screw-threaded thimble or sleeve run upon the upper end of the tube H. L and L' are perforated disks or flanges attached to the thimble K. The disk L may be stiffened by means of radial arms n n, terminating in an annular part, n'. The disk L' lies a little below the top of the cup, and the disk L constitutes the top or lid of the cup. C' is a lid on the pouring-lip.

In order to use the pot now described for making coffee for table use, I first remove the lid D and the thimble K, and the parts attached thereto, and place within the cup, and upon the flange or disk J', a suitable amount of ground coffee. This coffee should not be fine enough to pass through the disk. The amount of ground coffee necessary to be used will depend either upon the amount of liquid coffee desired, or upon the strength preferred. To make, say, six pints of good liquid coffee for table use, I use about two table-spoonfuls of ground coffee. I then replace the parts removed, lift the lid F', and pour a suitable amount of water through the tube F into the lower chamber of the pot, and then close this lid. This water may also be poured through the opening through which the tube H passes, the latter being removed for that purpose. The pot may now be set upon the stove, and when steam is generated in the lower chamber the water and steam will pass out through the tube H and ports e e, mingle with the ground coffee, and pass upward, through the disks J', L', and L, into the upper chamber of the pot, when the liquid coffee thus made may be poured off in the usual manner. Water may be added from time to time in like manner, or, if the coffee thus produced be too strong, it may be weakened by pouring water into the upper chamber. Tea and other herbs may be steeped in like manner.

The flange a is not essential, provided the steam is sufficiently prevented from escaping from the lower chamber through the tube G. This tube may also be omitted, but is here shown as a suitable means for supporting the tube H vertically. The joints need not be perfectly steam-tight. The lid F' should either be fastened when closed, or made sufficiently heavy to resist the escape of steam at this point. The disks L and L' prevent the ground coffee from being carried out of the cup I, and the disk J' keeps it from entering the ports e e. Only one of the upper flanges, however, is essential to prevent the ground coffee from being mingled with the contents of the upper chamber. If preferred, all the perforated flanges may be removed from the cup, and the ground coffee may be placed in an ordinary wire-cloth shell, and the latter arranged in the cup. Hair-cloth may also be used to confine the ground coffee in the cup.

The pot is simple in its construction and operation, is easily managed and kept clean and in order, and produces good liquid coffee, free from grounds.

Having thus described my invention, what I claim as new, and desire to secure by Letters Patent, is—

The combination, substantially as herein described, in connection with the body of a coffee-pot or other steeping-vessel, of the horizontal diaphragm E, arranged centrally therein, the vertical tube H, passing through the said diaphragm, and having an open end supported a little way above the bottom of the pot, the cup I, arranged above the diaphragm E, and communicating with the tube H through one or more openings or ports, e e, arranged to lie below a filter for retaining the grounds within the said cup, and the pouring-lip C, entering the upper chamber of the pot, for the purposes specified.

MATTHEW J. DEWALD.

Witnesses:
F. F. WARNER,
J. H. LAWLOR.